United States Patent [19]

Bachovchin et al.

[11] Patent Number: 5,433,771
[45] Date of Patent: Jul. 18, 1995

[54] HOT GAS FILTRATION SYSTEM FAIL-SAFE AND THERMAL REGENERATION DEVICE

[75] Inventors: Dennis M. Bachovchin; Thomas E. Lippert; Gerald J. Bruck, all of Murrysville, Pa.

[73] Assignee: Westinghouse Electric Corporation, Pittsburgh, Pa.

[21] Appl. No.: 232,885

[22] Filed: Apr. 25, 1994

[51] Int. Cl.$^6$ ............................................. B01D 46/00
[52] U.S. Cl. ...................................... 95/280; 55/267;
55/302; 55/486; 55/487; 55/523; 55/525; 95/288
[58] Field of Search .................. 55/267, 302, 486, 487, 55/516, 518, 523, 525, 519; 95/280, 283, 288

[56] References Cited

U.S. PATENT DOCUMENTS

| | | | |
|---|---|---|---|
| 3,816,977 | 6/1974 | Gordon et al. | 55/302 |
| 3,853,508 | 12/1974 | Gordon et al. | 55/302 |
| 4,026,685 | 5/1977 | Grix | 55/302 |
| 4,343,631 | 8/1982 | Ciliberti | 55/302 |
| 4,539,025 | 9/1985 | Ciliberti et al. | 55/302 |
| 4,553,986 | 11/1985 | Ciliberti et al. | 55/68 |
| 4,735,635 | 4/1988 | Israelson et al. | 55/71 |
| 4,764,190 | 8/1988 | Israelson et al. | 55/269 |
| 4,812,149 | 3/1989 | Griffin et al. | 55/71 |
| 4,881,959 | 11/1989 | Kono et al. | 55/267 |
| 4,903,287 | 2/1990 | Lippert et al. | 55/302 |
| 4,973,458 | 11/1990 | Newby et al. | 423/244 |
| 5,143,530 | 9/1992 | Haldipur et al. | 55/341.1 |
| 5,185,019 | 2/1993 | Haldipur et al. | 55/378 |
| 5,338,326 | 8/1994 | Jelich et al. | 55/302 |
| 5,346,533 | 9/1994 | Jelich et al. | 55/302 |
| 5,348,572 | 9/1994 | Jelich et al. | 55/302 |

OTHER PUBLICATIONS

S. Soung, et al., KRW High Temperature Coal Gas Desulfurization, Presented at the First Int. Conf. on Separation Science and Technology, Apr. 1986.

M. G. Klett, et al., Conceptual Designs of Advanced High-Temperature Desulfurization Processes, vol. II, Dec. 1986 (NTIS No. DOE/MC/21098-2248-vol. 2).

Southern Company Services, Inc. Assessment of Coal Gasification/Hot Gas Cleanup Based Advanced Gas Turbine Systems, Final Report, Dec. 1990 (NTIS No. DOE/MC/26019-3004).

Proceedings of the Eleventh Annual Gasification and Gas Stream Cleanup Systems Contractors Review Meeting, Aug. 1991, NTIS No. DOE/METC-91/6123, vol. 1 and vol. 2).

*Primary Examiner*—C. Scott Bushey

[57] ABSTRACT

A fail-safe back-up filter system for filtering particles from a flow of hot gas in a coal gasifier or the like in the event of a failure of the primary filter system. In the event of a break in one of the primary filter elements of the filtration system, the back-up filters, having a higher porosity than the primary filters, begin to collect particulate matter such that the particulates become embedded in the back-up filter. After a period of time, the back-up filters become clogged and prevent the flow of particle laden gas through the back-up filter and the corresponding primary filter such that the flow of gas is diverted into communication with the remaining, properly functioning primary filters. The back-up filters also provide a thermal regenerator device for heating the flow of cleaning gas before it contacts the primary filter elements during back-flush cleaning in order to avoid the effects of extreme temperature fluctuations on the primary filters.

11 Claims, 3 Drawing Sheets

HOT GAS FILTRATION SYSTEM FAIL-SAFE AND THERMAL REGENERATION DEVICE

FIELD OF THE INVENTION

The present invention relates generally to multi-element hot gas filtration systems. More particularly, this invention relates to a fail-safe backup system for filtering particulate matter from the hot gas flowing through the system in the event of a failure of one or more elements of the primary filter system and for providing thermal regeneration to heat a flow of cold gas through the system during a cleaning operation.

BACKGROUND OF THE INVENTION

Many processes exist wherein a hot gaseous medium is produced which contains particulate material that must be separated from the gaseous medium, either to prevent pollution, or to remove hazardous material. High temperature filtration of particulates has become an important component in many emerging technologies. Advanced coal conversion technologies, such as fluid bed gasification and combustion, are dependent upon the successful removal of particulates at temperatures in the range of about 500° to 1100° C. Other applications which benefit from high temperature filtration range from gas cleaning for biomass gasification to power generation from the incineration of municipal solid wastes. These applications require the removal of particulates from gas streams at high temperature so that process equipment, such as rotating machinery and heat exchange surfaces, remain functional and efficient throughout the use of such equipment.

Rigid ceramic filters are currently being developed and used for separating entrained particles, such as flyash or char, from the hot gases produced in these energy generating systems and industrial processes. In these hot gas filtration systems, the ceramic filter serves as the only filter device for trapping undesirable particles contained in the flow of hot gases which pass through the filtration system.

One type of ceramic filter element, the cross flow filter, is described in U.S. Pat. No. 4,343,631—Ciliberti, which is incorporated herein in its entirety by reference, and is assigned to the assignee of the present invention. The cross flow filter comprises several layers of porous ceramic membranes joined together in such a manner as to maximize filter area per unit volume. Particle laden gases pass into dirty side channels of the filter and then through the filter membranes where the particles are deposited as cake on the surface of the membranes within the dirty side channels. The cleaned gases then pass into and through the clean side channels of the filter and subsequently exit the filter. Generally within the filter system, a plurality of such filter elements are connected to a single plenum pipe through which the filtered clean gas passes after flowing through the filter elements.

The filter elements are periodically cleaned by providing a pulse of high pressure gas which is pumped through a pulse cleaning pipe in flow communication with the plenum pipe. The pulse of high pressure gas causes reverse flow through the filter elements which dislodges the cake of particles trapped by the filter elements such that the cake falls out of the filter elements and is collected and disposed of through a discharge point in a known manner. The high pressure gas used to clean the filters is usually cold due to the known difficulties of pulsing high temperature gas with existing valves.

A second type of rigid ceramic filter is referred to as a candle filter and comprises a hollow cylinder which is closed at one end and flanged at the other for attachment to a tubesheet or blowback plenum, into which cleaned gas passes during the filtration cycle. Particle laden gas passes through filter elements around the cylinder such that the particles are trapped in the filter and the clean gas flows into the hollow center of the candle and out through the open end. In the system, a plurality of these candles are connected to a plenum pipe such that the clean gas from the plurality of candles flows into the plenum pipe. A pulse of cold gas is periodically blown into the candles for dislodging the cake from the filter elements.

Candle-type ceramic barrier filters of the general type discussed above are disclosed in U.S. Pat. No. 4,973,458—Newby et al.; U.S. Pat. No. 4,812,149—Griffin et al.; U.S. Pat. No. 4,764,190—Israelson et al.; U.S. Pat. No. 4,735,635—Israelson et al.; and U.S. Pat. No. 4,539,025—Ciliberti et al., each of which is incorporated herein in its entirety by reference.

However, problems have been recognized in the use of hot gas filtration devices comprising rigid ceramic filter systems. Since these types of filter devices comprise porous ceramic materials which are subjected to high temperature corrosive environments, with fluctuations in temperature, one or more of the individual filter elements in the system can break under the influence of these conditions. Moreover, since the pulse of high pressure gas is cold, the elements are subjected to severe changes in temperature such that the filter elements are further prone to breaking. Where one or more of the filter elements in the system breaks, leaving a hole in the filter, an open path through the filter vessel is available such that the flow of gas through the hole is limited only by the relatively small flow resistance of the orifice left by the missing pieces of ceramic material. Thus, dirty particles remain in the gas after passing through the filtration system, resulting in a substantial decrease in the overall efficiency of the system and adverse effects on the environment.

Although research and development efforts are currently being carried out to improve the ceramic materials of these filtration systems so as to reduce the susceptibility of the components to breakage under such adverse conditions, there is presently a need for a fail-safe backup filter device for collecting the particles of dirty gas which pass through the filter vessel in the event of a break in one or more of the individual filter elements. Also, since a fail-safe backup filter in accordance with the present invention provides sufficient thermal capacity and heat transfer area for minimizing the adverse effects of severe temperature fluctuations on the filter elements during periodic reverse flow pulsations, the present invention provides a currently available solution to the problems associated with pulse flow cleaning of known filtration systems.

SUMMARY OF THE INVENTION

The present invention provides a fail-safe filter for a hot gas filtration system comprising a vessel, a plurality of primary filter elements disposed in the vessel and in flow communication with a flow of hot gas, a plurality of secondary filter elements disposed in the vessel such that one of the secondary filter elements is disposed directly downstream and adjacent to a corresponding primary filter element. The porosity of the secondary filter elements is greater than the porosity of the primary filter elements such that the secondary filter element becomes clogged and prevents the flow of particulates through the secondary filter element and the corresponding primary filter element at some time after the primary filter element becomes broken and fails to efficiently filter particulates from the flow of hot gas. Thus, the flow of particulates is forced into flow communication with the remaining primary filter elements in order to maintain the particulate collection efficiency at acceptable levels until the broken primary filter element can be repaired. Cleaning means provide a second flow of gas through the secondary filter elements and subsequently through the primary filter elements such that particulates collected by the primary filter elements become dislodged therefrom and particulates collected by the secondary filter elements remain lodged therein.

DETAILED DESCRIPTION OF THE PREFERRED EMBODIMENTS

Figure 1:
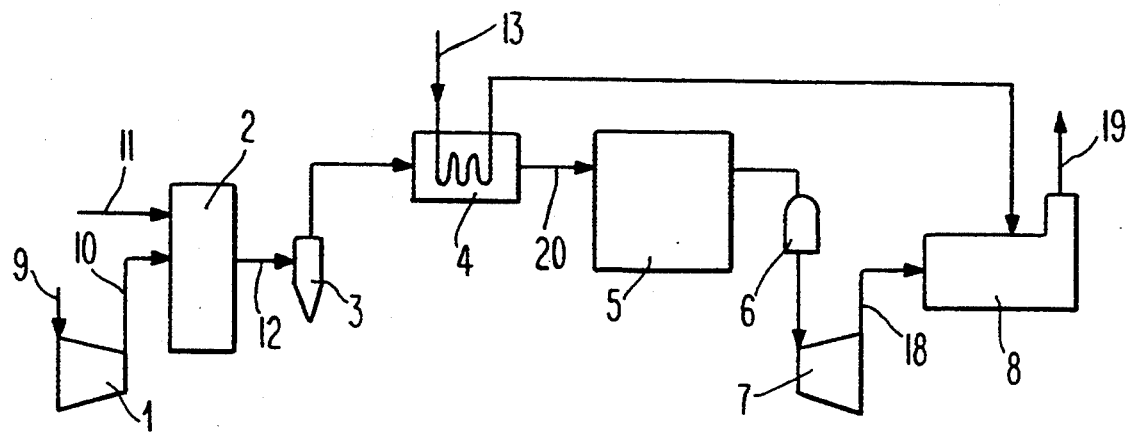
FIG. 1 is a schematic diagram of an integrated coal gasification gas turbine power plant using the hot gas filtration system of the present invention.

Referring to the drawings, there is shown in FIG. 1 a schematic diagram of an integrated coal gasification gas turbine power plant. The plant comprises a compressor 1 that inducts ambient air 9 and produces high pressure air 10 that is used to gasify coal 11 in a gasifier 2. The gasifier produces a fuel gas 12 that may have a temperature and pressure as high as 1650° C. (3000° F.) and 2760 kPa (400 psia), respectively, and that is laden with particles, chiefly coal slag and ash. The fuel gas 12 is passed through a cyclone separator 3 in which a portion of the particulate matter is removed. The fuel gas then flows through a heat exchanger 4 supplied with feedwater or steam 13 and in which the temperature of the fuel gas is reduced to approximately 925° C. (1700° F.).

The fuel gas 20 from the heat exchanger 4 is then processed in the hot gas filtration system 5 according to the present invention, as discussed below. Subsequently, the clean gas is combusted in a combustor 6 where a supplemental fuel, such as oil or natural gas, may be added and the hot gas is expanded in a turbine 7. The expanded gas 18 from the turbine 7 flows through the heat recovery steam generator 8 which is supplied with heated feedwater or steam from the heat exchanger 4, and the gas 19 is then exhausted into the atmosphere.

Figure 2:
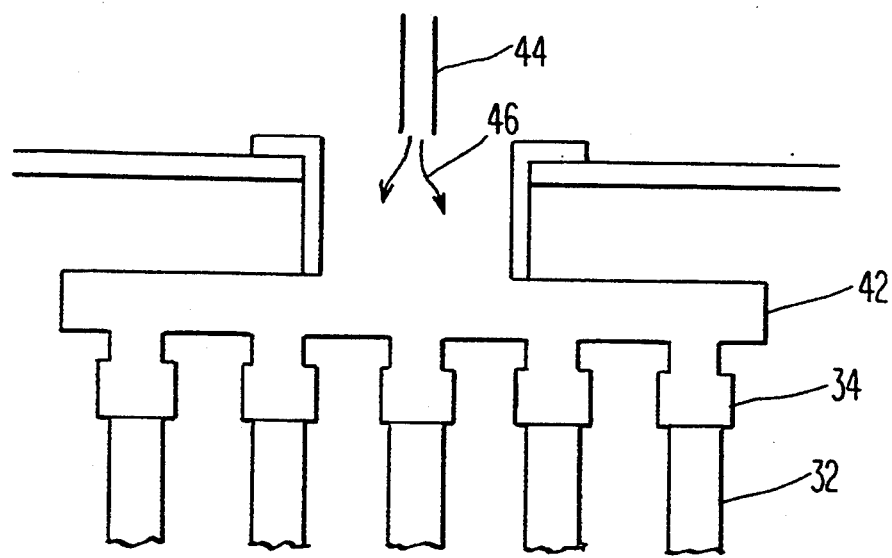
FIG. 2 shows one embodiment of a hot gas filtration system in accordance with the present invention.
Figure 3:
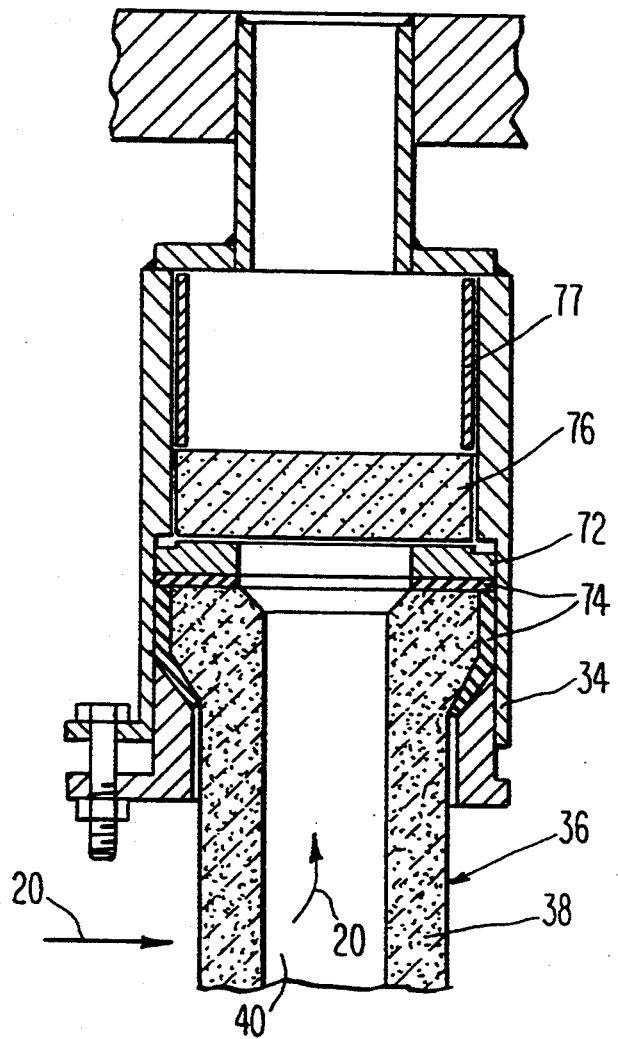
FIG. 3 shows a longitudinal cross-section of a candle filter element in accordance with the embodiment of FIG. 2.

There is shown in FIG. 2 one embodiment of a hot gas filtration system in accordance with the present invention. A plurality of candle filter elements 32, each comprising a hollow cylindrical body, are fixed into respective holders 34 for mounting the filter elements within the system. Referring to FIG. 3, a flow of hot fuel gas 20 containing undesirable particulate matter, such as dust particles and fly ash, is directed from a heat exchanger into the exterior surface 36 of the cylinder of each of the filter elements 32.

Each candle filter element is comprised of a hollow ceramic tube 38 which is porous such that the hot gas flows through the porous walls of the tube. The porous walls are a primary filter for filtering out the undesirable particulates in a known manner, leaving the particulate matter collected as a filter cake on the exterior surfaces of the tube. Accordingly, the flow of hot fuel gas 20 flows into the central portion 40 of the filter element with the particles removed therefrom. The cleaned fuel gas flows from the hollow central portion of the candle filter element into a common plenum 42 and then discharges through a gas outlet (not shown).

In a preferred embodiment, ceramic tube 38 comprises a plurality of layers of porous ceramic membranes joined together in such a manner as to maximize filter area per unit volume. The ceramic tube is an absolute filter in that all of the undesirable particles in the flow of hot gas 20 are trapped by the filter such that the flow of hot gas into the central portion 40 of the filter element does not contain any particulate matter, provided the primary filter is completely operational without any holes or other type of breakage of the filter.

In a preferred embodiment, a pulse-type cleaning system is incorporated into the hot gas filtration system. Cleaning of the system is accomplished by connecting the pulse cleaning pipe 44, which is connected to the output of a pulse compressor (not shown) in a known manner, to the plenum 42 by means of a pulse control valve (not shown). The compressor directs pulses of gas 46, such as nitrogen or fuel gas, into the hollow central portions 40 of the candle filter elements 32. These pulses of gas force the cake on the exterior surfaces of the filter elements to dislodge therefrom such that excessive buildup of undesirable particulate is removed from the filtration system and collected and discarded in a known manner.

Figure 4:
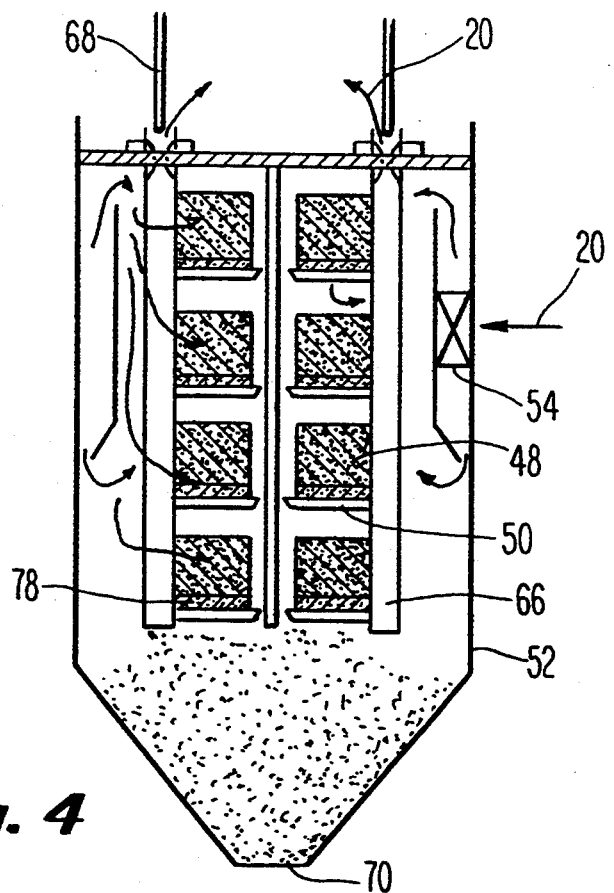
FIG. 4 shows a second embodiment of a hot gas filtration system in accordance with the present invention.
Figures 5A, 5B:
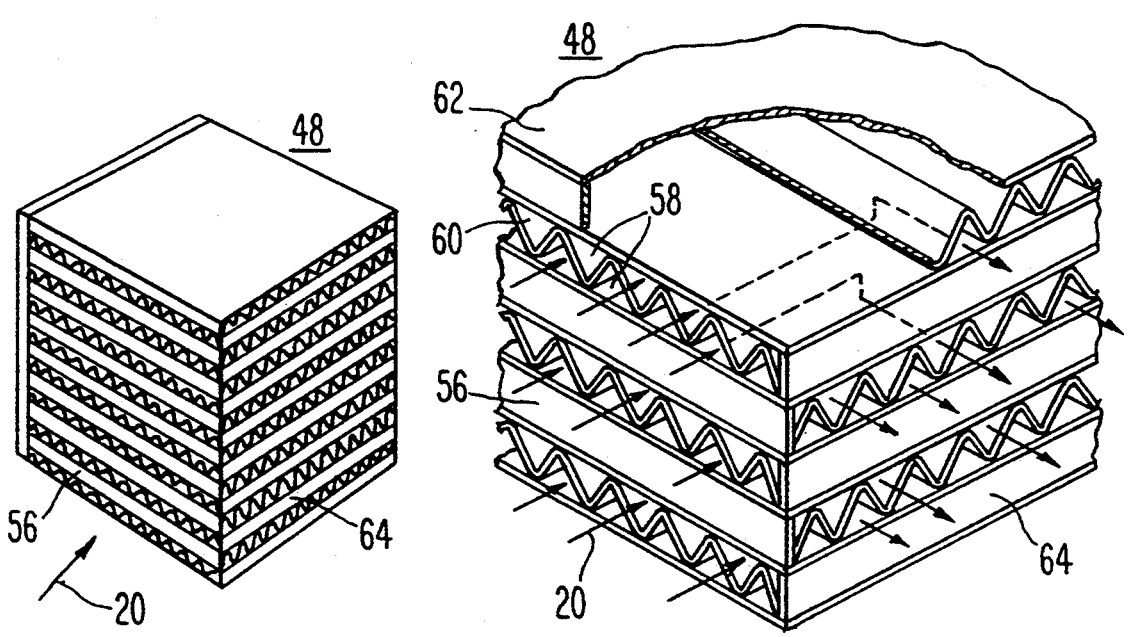
FIGS. 5a and 5b show a cross-filter element in accordance with the present invention.

A second embodiment of a hot gas filtration system in accordance with the present invention is shown in FIGS. 4 and 5a, 5b. A plurality of cross-flow filter elements 48 are mounted on holders 50 in vessel 52. Hot gas 20 flows into vessel inlet 54 and is distributed into the exterior side surfaces 56 of the individual filter elements 48. The gas flows through inlet channels 58 formed by corrugated sheets 60 and through layers of gas permeable membranes 62, preferable ceramic, such that undesirable particulate matter is filtered out of the flow of hot gas and is collected as a filter cake on the membranes 62 in a known manner. The clean flow of hot gas flows out of the exterior surface 64 of the individual filter elements. The filter elements are mounted in holders 50 such that the exterior surface 64 is disposed downward facing the holder. The clean gas flows into plenum 66 and out of the vessel in a known manner. As discussed above, the filter elements 48 are absolute in that the flow of clean gas is entirely free of particulate matter provided the filter element is properly functioning and has no holes or other breakage.

Pulse cleaning pipe 68 directs pulses of cold gas through the filtration system as discussed above for dislodging the collected filter cake from the cross-flow filter elements 48. A solids outlet 70 at the bottom of the vessel 52 allows the particles removed from the fuel gas to be discharged from the vessel.

The present invention is not intended to be limited to practices using the candle-type filter elements or the cross-flow filters discussed above. The invention could also be practiced using other types of high performance, high temperature primary filters, such as bag filter elements, for example, as set forth in U.S. Pat. No. 4,553,986—Ciliberti et al., incorporated herein in its entirety by reference.

The primary filter elements of the hot gas system, such as the individual candle filter elements 32 or the cross-flow filter elements 48, are prone to breakage due to operation of the system in a corrosive environment or under the influence of extreme fluctuations in temperature. For example, the filter elements are generally exposed to temperatures in the range of 1500° F. or higher during normal operation. However, the cold gas pulsed into the system during cleaning may be in the temperature range up to about 300° F. Thus, the ceramic filter elements are known to experience thermal shock during reverse pulse flow cleaning such that the filter elements suffer a loss of strength and break, leaving cracks or holes in the filters.

When a primary filter element breaks, the only resistance to the flow of particle laden gas through the filter in the area of the break is the size of the orifice left behind. Since the size of such an orifice will be many times larger than the pores in the filter membranes, significant quantities of dirty gas pass through the filter element, and overall filtration system collection efficiency is undesirably lowered.

Referring once again to FIG. 3, a fail-safe back up filter system for a candle filtration system is shown. Retaining ring 72 secures gaskets 74 in holder 34 for providing a tight seal of the flanged portion of the candle in the holder. Back-up filter 76 is disposed above retaining ring 74 such that the back-up filter is disposed directly downstream of the primary candle filter element to act as a secondary, emergency fail-safe filter. Back-up filter 76 can be adapted to conform to the particular size of the candle filter element 32 being used. For a candle filter element, the shape of the back-up filter 76 is preferably a disc or can be a cup inverted over the flanged top end of the candle filter element. Spacer 77 is provided, if necessary, for firmly securing the back-up filter in the candle holder.

Referring to FIG. 4, a back-up filter in accordance with the present invention for a cross flow filtration system is shown. Back-up filter 78 is disposed in holder 50 such that the back-up filter is located directly below exterior surface 64 through which the clean gas passes from the primary filter element 48. The back-up filter 78 can be adapted to conform to the particular size and shape of the cross-flow filter element 48 being used.

Back-up filter 76, 78 is a fail-safe filter element having a high porosity and permeability, which are greater than the porosity and permeability of the primary filter elements, such as ceramic tube 38 or cross-flow filter element 48. Thus, the back-up filter provides negligible resistance to clean gas which has passed through a properly functioning primary filter element. The back-up filter 76, 78 does not filter and collect particles from the clean gas which has passed through a properly functioning primary filter since the primary filter has a lower porosity and permeability and filters out all undesirable particulate matter when the primary filter is functioning properly without any breakage.

When a primary filter element breaks, flow increases through the back-up filter 76, 78 due to the absence of flow resistance provided by the primary filter element. Accordingly, the back-up filter has a porosity and permeability which causes a portion of the undesirable particulate matter passing through the broken primary filter element to become embedded in the back-up filter. In contrast to the primary filter element, which has a very low porosity and permeability such that the particulate matter forms a cake on the exterior surfaces of the filter element, the back-up filter is of a deep-bed nature such that the particulate matter is embedded within the back-up filter.

The back-up filter 76, 78 causes the flow of gas to be throttled far below that which would have occurred in the absence of a back-up filter due to the resistance to flow of the back-up filter. Accordingly, the flow of dirty gas is throttled and particulate matter becomes embedded within the back-up filter such that the back-up filter removes a significant amount of particulate matter from the flow of hot gas through the filtration system. Eventually after a period of time, the back-up filter becomes plugged due to its deep bed nature such that the back-up filter provides complete flow resistance to the flow of hot gas through the associated primary filter element and thus, cuts off the flow of dirty gas through the system. The flow of dirty gas flows through the remaining primary filter elements, and their associated back-up filters, until the broken primary filter elements can be repaired.

During pulse flow cleaning of the primary filter elements, a back-up filter in accordance with the present invention has a porosity so as to provide negligible resistance to the reverse flow of gas through the system. During the cleaning operation where one or more of the primary filter elements has broken, any particulate matter embedded in an associated back-up filter will not become dislodged from the back-up filter due to its deep-bed nature and thus, dirty particles will not be blown back into the system.

Moreover, a back-up filter in accordance with the present invention provides a heat exchange surface disposed upstream of the reverse flow of cold cleaning gas through the primary filter elements. Thus, the back-up filter preheats the backflush gas before the gas contacts the primary filter element so as to reduce the effect of extreme temperature fluctuations on filtration systems which have heretofore not had a back-up filter in accordance with the present invention. Accordingly, the temperature modification provided by the back-up filter during reverse flow cleaning can reduce the thermal fatigue of the primary filter element and extend the useful life of the filtration system.

A back-up filter in accordance with the present invention can be selected from a wide variety of materials having a sufficiently high porosity and permeability for the particular filtration system being practiced. In one embodiment, the back-up filter comprises a bed of large particles, such as gravel rocks, disposed in a holder directly downstream of the primary filter element. In a second embodiment, the back-up filter comprises a bed of engineered particles manufactured to have a specific porosity, such as commercially available Raschig rings or Berl saddles. In a third embodiment, the back-up filter comprises a solid, rigid mass of porous material, preferably a ceramic foam material as commercially manufactured by Selee, Hi-Tech Ceramics, and Astromet. In this embodiment 20–100 pores per inch (ppi) is the preferred range of pore size, with 80% or more porosity. In a fourth embodiment, the back-up filter comprises one or more layers of wire mesh screens of corrosion resistant metals or alloys, such as stainless steel or commercially available Haynes 25, preferably having a mesh size in the range of 100 to 300. In this embodiment, the wire mesh screens can be supported on either side by open ceramic foam supports or by coarser screens.

Figure 6:
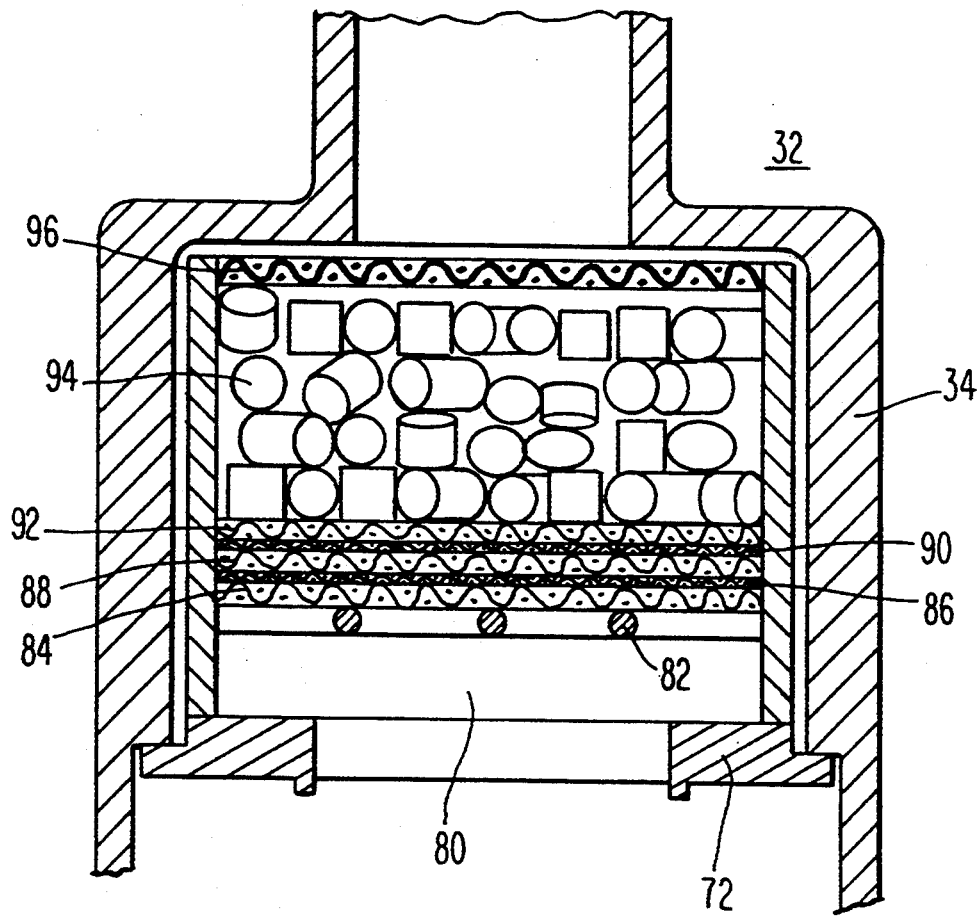
FIG. 6 shows an embodiment of a back-up filter in accordance with the present invention.

A preferred embodiment of a back-up filter is shown in FIG. 6 wherein the back-up filter is shown incorporated into a candle filter element 32 as shown in FIG. 3 and incorporates the features shown in that figure. A gap 80 is provided between retaining ring 72 and supporting rings 82 which support the back-up filter above the gap. The gap 80 allows for distribution of the gas over the surface area of the back-up filter. The preferred back-up filter comprises the following successive layers supported upon each other, respectively, above the gap: a first coarse screen 84, a first fine screen 86, a second coarse screen 88, a second fine screen 90, a third coarse screen 92, a bed of particles 94, and a fourth coarse screen 96. Preferably, coarse screens 84, 88, 92, 96 comprise 5 mesh, 0.080 wire of type 316 stainless steel. The fine screens 86, 90 comprise 80 mesh, 0.0055 wire of a corrosion resistant alloy, such as Haynes 25. The two layers of fine screens trap the particulate matter between them and prevent the collected particulate matter from being liberated from the back-up filter during the pulses of reverse flow cleaning. The bed of particles 94 is a thermal regenerator which heats the pulses of cold gas during reverse flow cleaning before that cold gas contacts the primary filter elements. Preferably, the bed of particles 94 comprises Raschig rings made of type 310 stainless steel having a 0.25 inch (0.635 cm) diameter and which are 0.25 inches (0.635 cm) long. The fourth coarse screen 96 retains the particle bed in place.

Although particular embodiments of the present invention have been described and illustrated herein, it is recognized that modifications and variations may readily occur to those skilled in the art. Consequently, it is intended that the claims be intended to cover such modifications and equivalents.

We claim:

1. A system for filtering particulates from a flow of hot gas, comprising:
    a vessel;
    a plurality of primary filter elements disposed in said vessel and in flow communication with said flow of hot gas such that said hot gas flows through said primary filter elements, each said primary filter element having a membrane having a first porosity;
    a plurality of secondary filter elements disposed in said vessel, one of each said secondary filter elements disposed directly downstream and adjacent to a corresponding primary filter element, each said secondary filter element having a second porosity greater than said first porosity, wherein said secondary filter element becomes clogged and prevents the flow of said particulates through said secondary filter element and said corresponding primary filter element at some time after said secondary filter element begins to filter said particulates from the flow of hot gas such that said particulates are forced into flow communication with the remaining primary filter elements;
    a plurality of holder means, each for securing one of said secondary filter elements directly downstream and adjacent to one of said primary filter elements;
    cleaning means for providing a second flow of gas through said secondary filter elements and subsequently through said primary filter elements, wherein particulates collected by said primary filter elements become dislodged therefrom and particulates collected by said secondary filter elements remain lodged therein, and wherein said secondary filter elements heat said second flow of gas.

2. The hot gas filtration system of claim 1, wherein said secondary filter elements comprise a bed of gravel rocks.

3. The hot gas filtration system of claim 1, wherein said secondary filter elements comprise a bed of Raschig rings.

4. The hot gas filtration system of claim 1, wherein said secondary filter elements comprise a bed of Berl saddles.

5. The hot gas filtration system of claim 1, wherein said secondary filter elements comprise a solid, rigid mass of ceramic foam.

6. The hot gas filtration system of claim 5, wherein said each said secondary filter element has 20-100 pores per inch with 80% or more porosity.

7. The hot gas filtration system of claim 1, wherein said secondary filter elements comprise one or more layers of wire mesh screens.

8. The hot gas filtration system of claim 1, wherein each said secondary filter element comprises, in successive order downstream of said primary filter element:
    a first wire mesh screen comprising 5 mesh, 0.080 wire of 316 stainless steel;
    a second wire mesh screen comprising 80 mesh, 0.0055 wire of a corrosion resistant alloy;
    a third wire mesh screen comprising 5 mesh, 0.080 wire of 316 stainless steel;
    a fourth wire mesh screen comprising 80 mesh, 0.0055 wire of a corrosion resistant alloy;
    a fifth wire mesh screen comprising 5 mesh, 0.080 wire of 316 stainless steel;
    a bed of Raschig rings;
    a sixth wire mesh screen comprising 5 mesh, 0.080 wire of 316 stainless steel.

9. The hot gas filtration system of claim 1, wherein said primary filter elements comprise candle filters, said candle filters having a ceramic membrane for filtering said particulates.

10. The hot gas filtration system of claim 1, wherein said primary filter elements comprise cross-flow filters, said cross flow filters having a ceramic membrane for filtering said particulates.

11. A method of removing particulates from a flow of hot gas, comprising:
    passing said flow of hot gas through a plurality of primary filter elements, each said primary filter element having a membrane having a first porosity, wherein said particulates become collected as cake on said membrane;
    passing said flow of hot gas through a secondary filter element disposed downstream and adjacent to a corresponding one of said primary filter elements, said secondary filter element having a second porosity greater than said first porosity, wherein said secondary filter element prevents the flow of particulates through said secondary filter element and said corresponding primary filter element at some time after particulates begin to become embedded in said secondary filter element such that the flow of particulates is forced into communication with the remaining primary filter elements;

passing a second flow of gas through said secondary filter element and then through said corresponding primary filter element such that particulates collected by said primary filter element become dislodged therefrom and particulates collected by said secondary filter element remain lodged therein, and wherein said secondary filter element heats said second flow of gas.

* * * * *